UNITED STATES PATENT OFFICE.

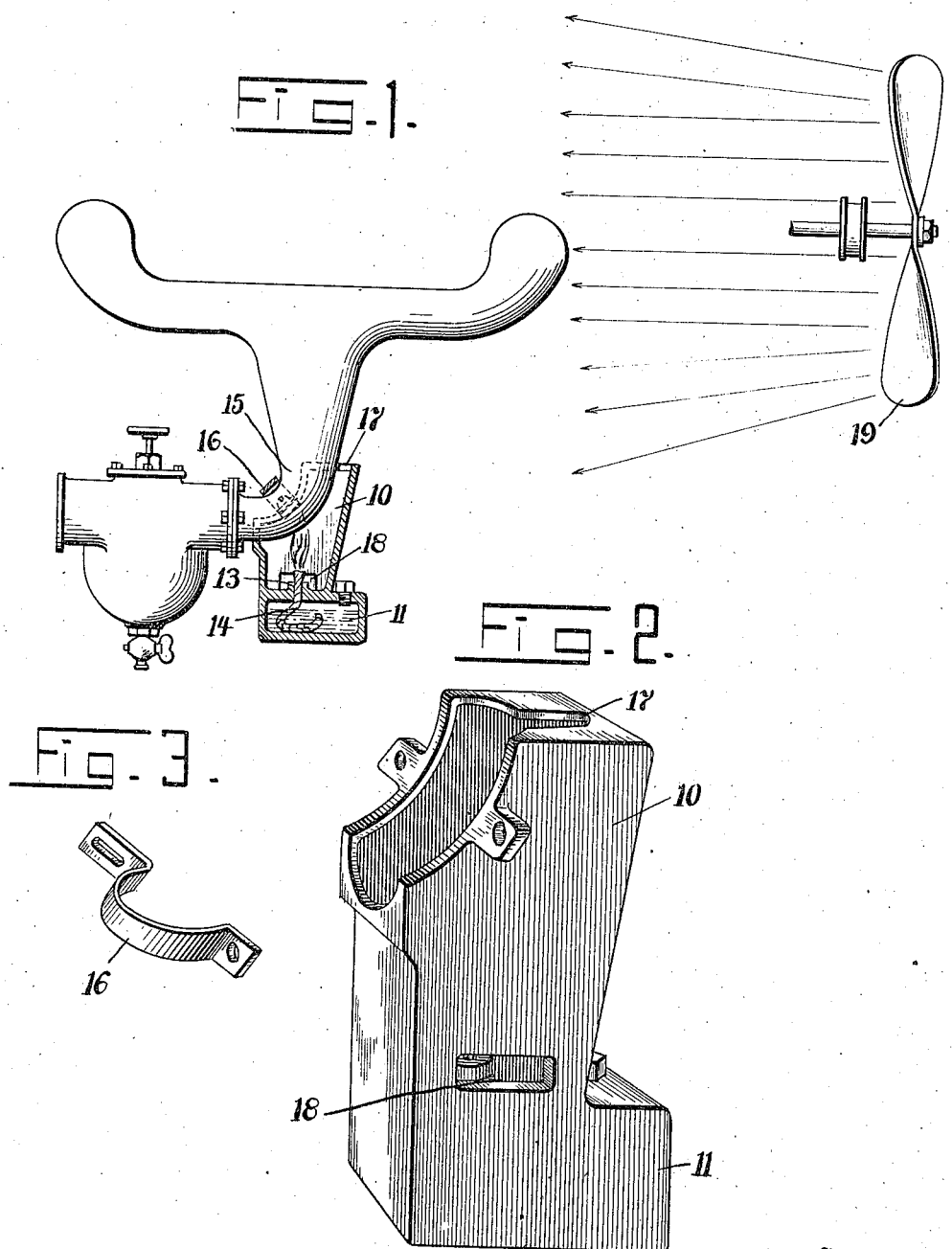

CHARLES A. LEWIS, OF DAYTON, OHIO.

HEATER FOR HYDROCARBON-FUEL INTAKES.

1,335,843.   Specification of Letters Patent.   Patented Apr. 6, 1920.

Application filed November 20, 1917. Serial No. 202,916.

*To all whom it may concern:*

Be it known that I, CHARLES A. LEWIS, a citizen of the United States, residing at Dayton, in the county of Montgomery and State of Ohio, have invented a new and useful Heater for Hydrocarbon-Fuel Intakes, of which the following is a specification.

My invention relates to a class of heaters to be used in starting a hydrocarbon motor and comprises a kerosene or spirit lamp to be attached to the manifold through which the fuel mixture passes from the carbureter to the cylinder. In the present disclosure the manifold is provided with a right angled bend near the carbureter and I have attached my heater to this bend, the advantage of which is that in rounding the bend the fuel mixture is forced against the portion of the manifold on which the flame plays, which heats it more thoroughly than if the heat were applied to a straight portion of the manifold. The advantage of applying the heat to the fuel mixture after it has passed the carbureter is that the fuel, which has been atomized by the carbureter and is present in the air in small particles, is easily vaporized. Moreover, if the mixture is sufficiently heated the vaporization is maintained notwithstanding the mixture enters a cold cylinder. The lamp is so located with reference to the fan and the vents of the lamp are so proportioned and located, that air currents from the fan extinguish the flame as soon as the motor is well started. The vents are preferably so located that air from the fan does not blow into them; on the contrary the air blows across the vent openings and by preventing the ingress of air smothers the flame. By this means evaporation of the oil or other fuel contained in the reservoir of the lamp is avoided.

In the accompanying drawing,

Figure 1 shows the intake manifold of an automobile motor with one of my heaters attached, the fan being shown in the position it occupies relative to the lamp.

Fig. 2 is a perspective view of the lamp.

Fig. 3 is a perspective view of the clamp for attaching the lamp to the manifold.

The lamp comprises a combustion chamber 10 with a fluid reservoir 11 below. In the top of the reservoir is a burner 13 through which passes a wick 14. The upper end of the combustion chamber is so formed as to fit up to and about half surround the bend in the manifold 15, a clamp 16 and bolts being used to secure the lamp to the manifold. A vent 17 is formed in the top of the chamber for the egress of products of combustion, these being emitted at a point where they will continue to impart heat to the manifold after their egress. Vents 18, one on each side of the lamp admit air to support combustion. The vents are preferably placed in the position shown so that air from the fan 19, which is operated by the motor in the usual way, will blow across them and prevent air from entering the lower ones or leaving at the upper one. The flame is thereby smothered by the fan as soon as it starts.

When the weather is cold enough to make starting difficult the lamp may be lighted a few minutes before the motor is to be started. Two or three minutes will usually be sufficient time in which to heat the manifold at the bend. Then when the motor is cranked the fuel mixture will be heated by passing the heated portion of the manifold, particularly when, as in the present case the heat is applied at a bend around which the mixture must pass. After the motor is started ample heat is supplied from the cylinders; hence the provision for automatically extinguishing the lamp as soon as the motor starts.

It is to be understood that minor modifications may be made without exceeding the scope of my claims, which are as follows:

1. In combination, a hydrocarbon motor, a fan operated thereby, an intake manifold attached to the motor, and a lamp attached to the manifold, said lamp having vents arranged in such positions that when the motor starts, the currents of air from the fan will extinguish the flame of the lamp without blowing into the vents.

2. In combination with a hydrocarbon motor, a fan operated thereby, and a fuel intake manifold serving the motor; a lamp attached to the manifold, having a combustion chamber with vents of such form and in such positions with reference to the fan that when the motor starts to run the currents of air from the fan will blow across the vents in such a manner as to prevent air entering or leaving the combustion chamber, thereby smothering the flame.

3. In combination with a hydrocarbon motor having a fuel intake pipe comprising a horizontal and a vertical portion joined by a bend, a heater attached to said pipe, comprising a lamp containing sufficient fuel for heating the pipe repeatedly and a combustion chamber; said chamber having an opening with a margin which fits around the lower half of the horizontal portion of the pipe, the outside half of the vertical portion and fits up to each side of the bend intermediate said points, thereby inclosing the outer half of the bend, the portion of the margin which fits to the vertical portion having a notch that acts as a vent for the products of combustion from the lamp, each side wall of the combustion chamber having an opening for the inlet of air to support combustion.

CHARLES A. LEWIS.